United States Patent [19]

Pfalzgraf

[11] Patent Number: 4,683,778
[45] Date of Patent: Aug. 4, 1987

[54] SYSTEM FOR SWITCHING A DRIVE DEVICE DEPENDENT ON SPEED

[75] Inventor: Manfred Pfalzgraf, Frankfurt am Main, Fed. Rep. of Germany

[73] Assignee: VDO Adolf Schindling AG, Frankfurt am Main, Fed. Rep. of Germany

[21] Appl. No.: 860,596

[22] Filed: May 7, 1986

[30] Foreign Application Priority Data

May 9, 1985 [DE] Fed. Rep. of Germany ....... 3516635

[51] Int. Cl.⁴ .................. B60K 41/18; B60K 41/10
[52] U.S. Cl. ........................ 74/858; 74/875; 74/DIG. 8
[58] Field of Search ........... 74/875, 872, 858, DIG. 8; 364/424.1

[56] References Cited

U.S. PATENT DOCUMENTS

| | | | |
|---|---|---|---|
| 2,433,235 | 12/1947 | Panish | 74/875 X |
| 2,760,611 | 8/1956 | Jaeschke | 74/875 X |
| 3,224,291 | 12/1965 | Zimmerman | 74/875 |
| 3,545,307 | 12/1970 | Bildat | 74/858 |
| 3,640,155 | 2/1972 | Waner et al. | 74/875 |
| 3,669,234 | 6/1972 | Mathers | 74/858 X |
| 4,266,447 | 5/1981 | Heess et al. | 74/858 |

Primary Examiner—Leslie Braun
Assistant Examiner—D. Wright
Attorney, Agent, or Firm—Martin A. Farber

[57] ABSTRACT

In a system for controlling a drive unit, particularly a boat drive unit, which comprises an internal combustion engine and a reversible gearing, with an operating member for adjusting the power and the direction of rotation, the operating member (1) feeds electric signals corresponding to the power and the direction of turning to a control device (5) which contains a microcomputer (6). Actuators (11, 12) for the power of the internal combustion engine and the switching of the reversible gearing respectively are connected to the control device (5). The control device (5) is developed in such a manner that switching of the reversible gearing is only possible when the speed of rotation of the internal combustion engine lies below a predetermined value.

9 Claims, 3 Drawing Figures

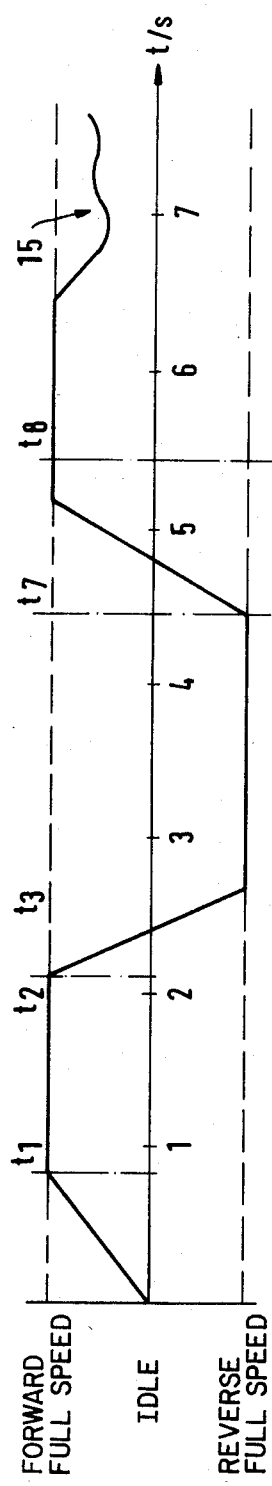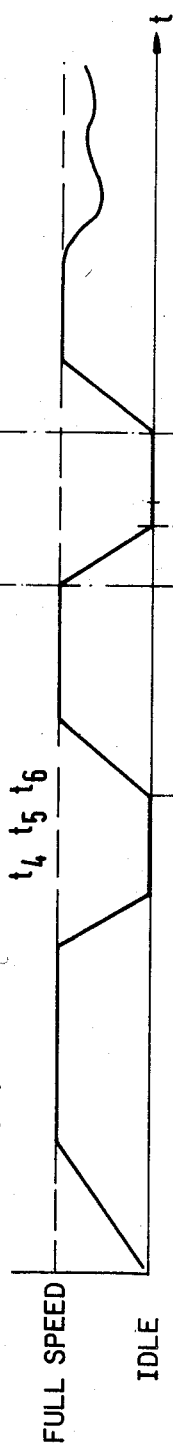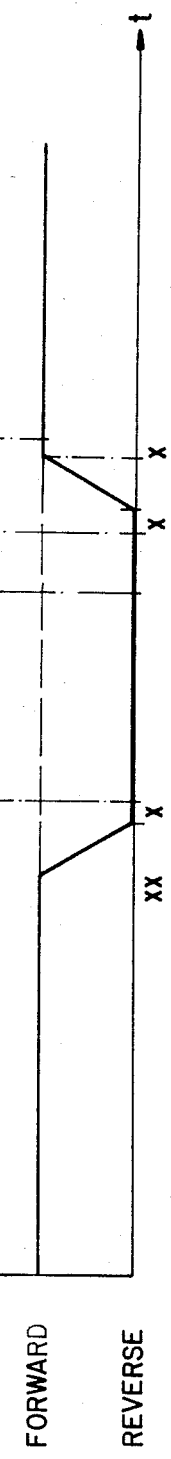

SYSTEM FOR SWITCHING A DRIVE DEVICE DEPENDENT ON SPEED

FIELD AND BACKGROUND OF THE INVENTION

The invention refers to a system for controlling a drive device, particularly a boat drive device, which comprises an internal combustion engine and a reversible gearing with an operating member for adjusting the power and the direction of turning.

Drives for boats ordinarily have a lever for controlling the power of the internal combustion engine and the reversible gearing. In its central position the engine power is throttled so that the engine idles. If the lever is moved forward up to the end position then the power of the engine increases up to full load operation, the reversible gearing being connected in forward direction. Upon the movement of the lever towards the rear, the power of the internal combustion engine is also increased, but the gearing upon leaving its neutral position is switched to the other direction of turning. These known control devices have the disadvantage that considerable damage to parts of the entire operating line of the boat, namely the gearing, the internal combustion engine, the propeller shaft and the propeller itself, can result from too rapid a switching between a high speed of rotation in forward direction and in the opposite direction of rotation.

SUMMARY OF THE INVENTION

It is an object of the invention to provide a system for controlling a drive device which avoids such damage and is nevertheless simple to operate.

According to the invention, the operating element(1) for the power and the direction of turning transmits corresponding electric signals to a control device (5) which contains a microcomputer (6). Separate actuators (11, 12) for the power of the internal combustion engine and for the switching of the reversible gearing are connected to the control device (5). The control device (5) is so developed that the switching of the reversible gearing is possible only when the speed of rotation of the internal combustion engine is below a predetermined value.

The system in accordance with the invention has the advantage that damage to the drive by improper switching is avoided and nevertheless a simple setting of speed and direction of travel is possible by means of a lever. If the operator moves the lever very rapidly from a forward position into a reverse position then the switching of the gearing and the accelerating of the internal combustion engine are merely delayed somewhat after the switching, this being scarcely noticeable as a rule by the operator.

The operating element(1) can comprise a lever (2) whose central position is associated with the idling speed of the internal combustion engine. After passing through the central position, the power actuator (11) is held in the idling position and the switching of the reversible gearing is delayed until the internal combustion engine has assumed the idling speed of rotation, while after the switching of the reversible gearing the power actuator (11) is brought into the position which corresponds to the position of the lever.

Also the delay in the switching of the reversible gearing continues for a predetermined period of time.

Further, the delay in the switching of the reversible gearing continues for a period of time which is calculated by the microcomputer on basis of the properties of the drive unit and the speed of rotation before the lever passes the central position.

Also, the switching of the reversible gearing is delayed until a speed-of-rotation transmitter associated with the internal combustion engine has reported that the idling speed of rotation has been reached.

Further, the operating element (1) contains a potentiometer (3), and the power and speed of rotation can be fed as value and sign of a dc voltage to the control device (5).

Moreover, each of the actuators (11, 12) is coupled to a separate position indicator (23, 24) which reports the position of the corresponding actuator (11, 12) to the control device (5).

One advantageous embodiment of the invention resides therein that the control device (5) for the two actuators (11, 12) has a common output stage (10; 18, 19) and a switch (9). In this way, a relatively expensive output stage for the second actuator is unnecessary. The switch (9) can be developed as a simple relay.

Further, the common output stage (10) can comprise two push-pull power stages (18, 19) which are controlled in phase opposition.

Also each of the actuators (11, 12) has a dc motor (20, 21) and a potentiometer (23, 24).

A further embodiment of the invention provides that, without the feeding of electric voltage, the power actuator (11) of the internal combustion engine is held by spring force in the idle position and the actuator for the reversible gearing is held in the position in which it is at the time. In this way assurance is had that, upon the switching of the final stage to the other actuating member, the actuating member in question is held in the position which is necessary for the actuating of the other actuator.

The power actuator (11) of the internal combustion engine is held by spring force in the idle position when no electric voltage is fed to it, and the actuator (12) for the reversible gearing is held by spring force in the position in which it is when no electric voltage is fed to it.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 2 is a voltage/time diagram serving to explain the block diagram of FIG. 1.

Identical parts are provided with the same reference numbers in the figures.

DETAILED DESCRIPTION OF THE PREFERRED EMBODIMENT

Figure 1:
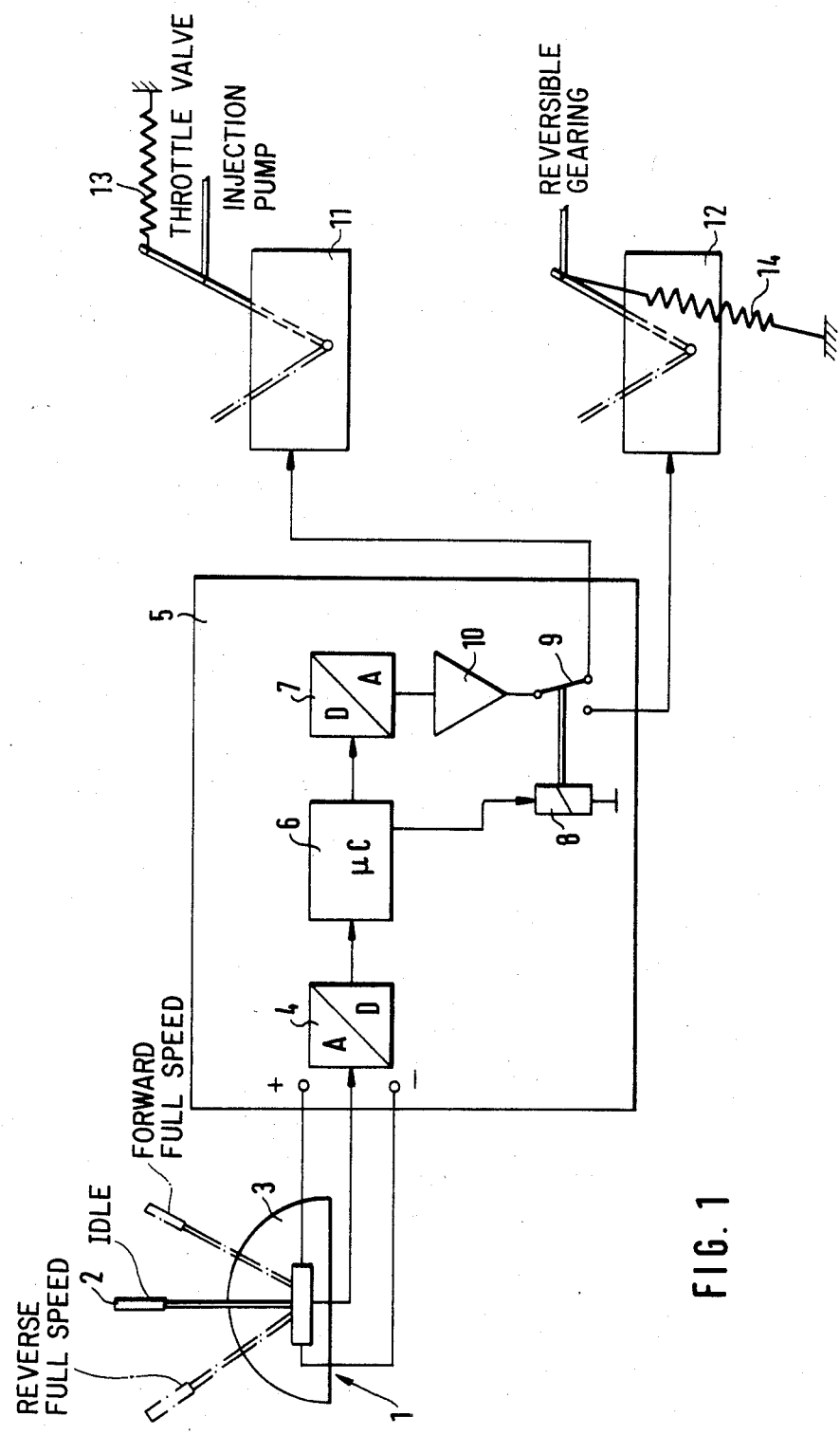
FIG. 1 is a block diagram of the embodiment.

In FIG. 1, 1 is the operating member which comprises a lever 2, which in its central position produces idling of the internal combustion engine and in its two end positions full speed of the internal combustion engine. Depending on the direction in which the lever 2 is turned, the reversible gearing is switched. In the embodiment shown in FIG. 1, the lever 2 is coupled with the wiper of a potentiometer 3. The ends of the resistance path of the potentiometer 3 are connected to positive and negative operating voltage respectively, while the wiper of the potentiometer 3 forms the output of the operating member and is connected to an analog-digital converter 4 within a control device 5. If the positive and negative operating voltages are the same in amount, then the amount of the voltage fed to the analog-digital converter 4 corresponds to the power of the internal combustion engine set at the time and the sign of the voltage corresponds to the position of the reversible gearing.

The output signals in the analog-digital converter are fed to a microcomputer 6 in which a program which will be briefly explained in connection with FIG. 2 is stored. A digital-analog converter 7 and the winding of a relay 9 are connected to outputs of the microcomputer 6. The output voltage of the digital-analog converter 7 is fed, via an output stage 10 and the switch contacts of the relay 9, either to an actuator 11 for regulating the engine power or to an actuator 12 for switching the reversible gearing. Neither the internal combustion engine nor the reversible gearing has been shown since they do not need to be explained in further detail for an understanding of the invention. The power of the internal combustion engine can be adjusted by displacing a throttle valve or an injection pump, depending on the type of internal combustion engine.

In accordance with a further development of the invention, each of the actuators 11, 12 is provided with a storage device which, in the case of the actuator 11, stores the idle position and, in the case of the actuator 12, the position instantaneously present, when no control voltage is fed from the control device 5. In FIG. 1, the position storages are represented diagrammatically by coil springs 13, 14. The actuators 11, 12 furthermore contain position indicators whose outputs are connected to corresponding inputs of the microcomputer 6 so that an acknowledgement of the present value of the position is given.

The function of the system shown in FIG. 2 will now be explained on basis of the diagrams of FIG. 2. Diagram (a) shows the position of the lever 2 (FIG. 1) and diagram (b) shows the position of the actuator 11 for the engine power, while diagram (c) shows the position of the actuator 12 for the reversible gearing. The time scale selected is merely intended to give an idea of the order of magnitude of the time, the times to be taken into consideration in the system of the invention depending, however, greatly on the nature, and particularly the size, of the drive unit. During a first period of time, $t_0$ to $t_1$, the lever 2 is brought from the center position into the front end position, which means full speed forward. The microcomputer 6 continuously scans the voltage given off by the potentiometer 3 and controls the actuator 11 accordingly. During this period of time the relay 9 is in the position shown in the drawing so that the actuator 11 is connected to the output stage 10. During this phase and during the following full-speed operation, the actuator 12 of the reversible gearing is in the forward position. Control voltage from the output stage 10 is required for this.

From $t_2$ to $t_3$ the lever 2 is brought in a manner approximately directly proportional to the time from the full-speed forward position into the full-speed rearward position. The actuator 11 follows along in this movement up to the time $t_3$, when the lever 2 reaches its idling position. Let us assume in this example that the lever is moved so fast that the speed of rotation of the internal combustion engine cannot follow the movement of the lever. Therefore the switching of the reversible gearing and the accelerating of the internal combustion engine are delayed. The actuator 11 is held in the idling position by the microcomputer up to the time $t_6$. At the time $t_4$ the internal combustion engine has reached its idling speed of rotation. The time x can either be a predetermined period of time which takes the inertia of the drive into consideration or it can be calculated by the microcomputer as a function of the previous speed of rotation and the speed of movement of the lever 2, in which case the data of the drive unit are also to be taken into consideration. Finally the internal combustion engine can have a speed of rotation sensor associated with it so that the further actions are only brought about when the idling speed of rotation has been actually reached.

At the time $t_4$, the relay 9 switches into the left-hand position so that the actuator 12 is connected to the output stage 10. The microcomputer 6 then controls the output stage 10 in such a manner that the actuator 12 is brought into the rearward position. This process is at an end at $t_5$ and is reported to the microcomputer 6 by a position indicator associated with the actuator 12, whereupon the relay 9 is again switched into the position shown in the drawing. At the time $t_6$, the actuator 11 is then brought by the microcomputer into the position determined by the lever 2. Between times $t_7$ and $t_8$ the reverse switching process is shown, namely from full-speed rearward to full-speed forward. Finally, the further course of diagrams (a) and (b) indicates at 15 that the actuator 11 follows all movements of the lever 2.

Figure 3:
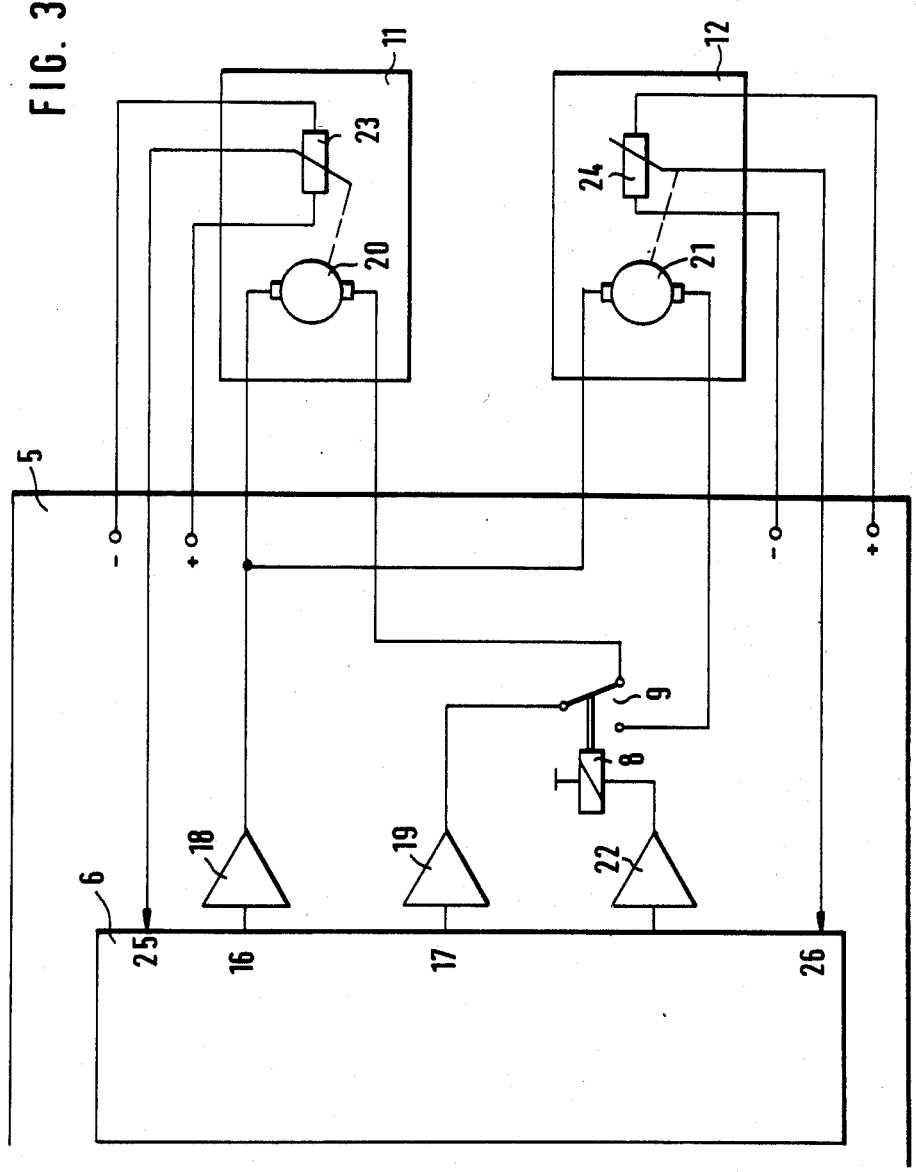
FIG. 3 is a portion of the block diagram of FIG. 1, shown in somewhat greater detail.

FIG. 3 shows a portion of the block diagram of FIG. 1 in somewhat greater detail. The microcomputer 6 contained in the control device 5 controls, without passing through an analog-digital converter, by means of two digital outputs 16 and 17 two power stages 18 and 19 which are developed as push-pull switches. As a function of the logical level present at the time at their inputs, the power stages 18, 19 connect their output to either a positive or negative pole of the source of operating voltage. The outputs of the power stages 18, 19 can be connected by means of the changeover contacts of a relay 9 to motors 20, 21 of the actuators 11, 12.

The coil 8 of the relay 9 is controlled via an output stage 22 by the microcomputer 6. If different logical levels are present at the outputs 16, 17 of the microcomputer, then one of the motors 20, 21 receives operating voltage. The direction of rotation is determined by what logical level is present at which of the outputs 16, 17. With identical logical levels at the outputs 16 and 17, the motors do not receive any operating voltage and therefore are at rest.

The actuators 11, 12 are known per se and need not be explained further within the scope of the application. Accordingly, additional parts such as gears, levers, etc. have also been omitted in the figures. In each of the actuators 11, 12 there is a potentiometer 23, 24 which is functionally connected to the motor and gives off to the microcomputer 6 a voltage corresponding to the instantaneous position of the actuator. For this purpose, the wipers of the potentiometers 23, 24 are connected to inputs 25 and 26 of the microcomputer while the end contacts of the resistance paths of the potentiometers 23, 24 are connected to the positive and negative terminals of the source of voltage.

For reasons of simplification, a similar type of actuator has been used in the embodiment described for the reversible gearing as for the internal combustion engine. However, it is entirely possible, within the scope of the knowledge of the man skilled in the art, to use a different type of actuator for the reversible gearing since in the case of the reversible gearing only a switching between two end positions is necessary while, in the case of the engine, operation which is as continuous as possible between idling speed and full speed is necessary. Accordingly, the potentiometer 24 can also, for instance, be replaced by limit switches.

LEGENDS OF DRAWINGS

FIG. 1
(a) full speed reverse
(b) idle
(c) full speed forward
(d) throttle valve
(e) (injection pump)
(f) reversible gearing FIG. 2
(g) operating member
(h) actuator 11
(i) actuator 12
(j) full speed forward
(k) idle
(l) full-speed reverse
(m) full-speed
(n) idle
(o) forward
(p) reverse

I claim:

1. In a system for controlling a drive device, particularly a boat drive device, which comprises an internal combustion engine and a reversible gearing connected to the engine, there being an operating element connected to the engine and the gearing for adjusting the power and the direction of turning of an output rotation of the drive device, the improvement comprising
   a control device containing a microcomputer, said operating element transmitting electric signals for power and for direction of turning to said control device;
   separate power actuators connected to said control device for selecting a power of the internal combustion engine and for switching the reversible gearing; and wherein
   said control device enables the switching of the reversible gearing only when a speed of rotation of the internal combustion engine is below a predetermined value; and wherein
   said operating element comprises a lever having a central position associated with an idling speed of the internal combustion engine; and wherein
   after a passing of the lever through said central position, one of said power actuators is held in an idling position and switching of the reversible gearing is delayed until the internal combustion engine has assumed the idling speed of rotation, while after the switching of the reversible gearing said one power actuator is advanced to a position which corresponds to the position of the lever; and wherein
   delay in the switching of the reversible gearing continues for a period of time which is calculated by said microcomputer on a basis of properties of the drive unit and the speed of rotation before a passing of said lever through the central position.

2. The system as set forth in claim 1, further comprising
   a speed-of-rotation transmitter connected to the engine, the switching of the reversible gearing being delayed until said a speed-of-rotation transmitter has reported that the idling speed of rotation has been reached.

3. The system as set forth in claim 1, wherein
   said operating element comprises a potentiometer providing a dc voltage to said control device, the power and speed of rotation being represented as a value and sign of the dc voltage.

4. The system as set forth in claim 1, further comprising
   separate position indicators, and wherein
   each of said actuators is coupled to a separate position indicator which reports the position of the corresponding actuator to the control device.

5. The system as set forth in claim 4, wherein
   each of said actuators has a dc motor and a potentiometer.

6. The system as set forth in claim 1, wherein
   said control device has a common output stage and a switch operatively coupled to said power actuators.

7. The system as set forth in claim 6, wherein
   said common output stage comprises two push-pull power stages which are controlled in phase opposition.

8. The system as set forth in claim 5, wherein
   said switch is a relay.

9. The system as set forth in claim 1, wherein
   a first of said power actuators which selects the speed of the internal combustion engine is held by spring force in an idle position when no electric voltage is fed to said first actuator, and
   a second of said actuators which switches the reversible gearing is held by spring force in a present position when no electric voltage is fed to said second actuator.

* * * * *